Jan. 12, 1965  L. DE MOSS  3,164,858

FISH SKINNING APPARATUS

Filed July 29, 1963

INVENTOR
LEONARD DE MOSS

BY *Rudolph L. Lowell*

ATTORNEY

United States Patent Office 3,164,858
Patented Jan. 12, 1965

3,164,858
FISH SKINNING APPARATUS
Leonard De Moss, 4008 Douglas Ave., Des Moines, Iowa
Filed July 29, 1963, Ser. No. 298,144
4 Claims. (Cl. 17—7)

This invention relates to a skin removal device and more particularly to a fish skinning apparatus.

It is the object of the invention to provide an improved hand operated apparatus for skinning fish.

Another object of the invention is to provide a fish skinning apparatus in which only the skins are removed from the fillets even though the skins may vary in thickness.

A further object of the invention is to provide a fish skinning apparatus in which the skin is pulled from the fish concurrently with the loosening of the skin from the flesh by a blade member.

Still another object of the invention is to provide a fish skinning apparatus in which a pair of side-by-side rollers having coacting teeth formed thereon are resiliently biased together and are used to peel the skin from the fish.

An additional object of the invention is to provide a fish skinning apparatus which is sturdy in construction, economical to manufacture, and efficient in operation in removing skin from fleshy products.

The exact nature of the invention as well as other objects and advantages thereof will be readily apparent from a consideration of the following specification relating to the annexed drawing in which:

FIG. 6 is a view similar to FIG. 2 showing a portion of a fish with the skin partially removed.

Figure 1:
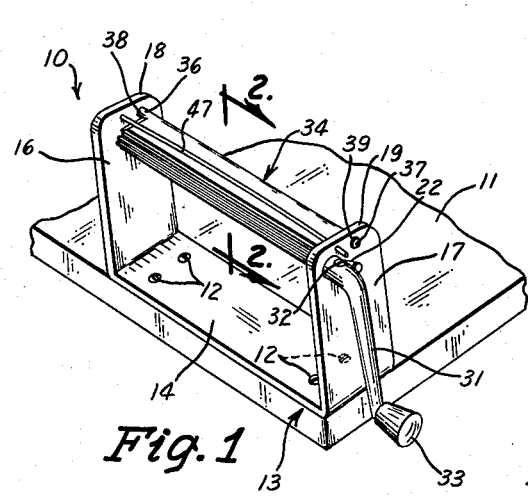
FIG. 1 is a perspective view of the fish skinning apparatus of this invention secured to a stationary support illustrated in fragmentary form.

Referring to the drawing, there is shown in FIG. 1 the apparatus of this invention indicated generally at 10. The apparatus 10 is positioned on a stationary horizontal support 11, such as the top of a work bench, and secured thereto by screws 12.

Figure 4:
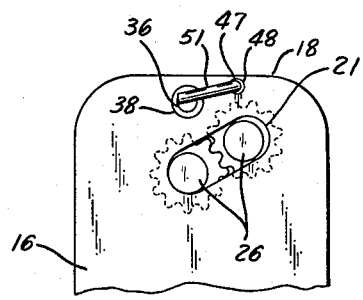
FIG. 4 is an end view taken along the line 4—4 of FIG. 3.

The apparatus 10 comprises a U-shaped frame 13 which is formed from a flat plate member. The frame 13 includes a flat base 14 and a pair of parallel upright legs 16 and 17. As shown in FIG. 1, the legs 16 and 17 are integral with the opposite ends of the base 14 and project in a direction which is substantially normal to the plane of the base. Each leg 16 and 17 has upper end sections 18 and 19, respectively, which have substantially identical inclined slots 21 and 22. As shown in FIG. 4, the slot 21 extends upwardly and forwardly from the midportion of the upper end section 18. As shown in broken lines in FIG. 2, the inclined slot 22 extends in the same direction and has substantially the same slope as the slot 21.

Figure 2:
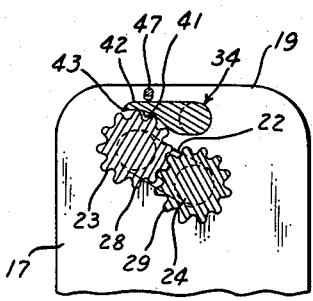
FIG. 2 is an enlarged sectional view taken along the line 2—2 of FIG. 1.
Figure 3:
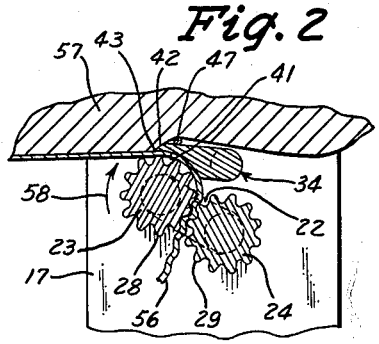
FIG. 3 is an enlarged front elevation view of the skinner unit of the fish skinning apparatus of FIG. 1.
Figure 3:
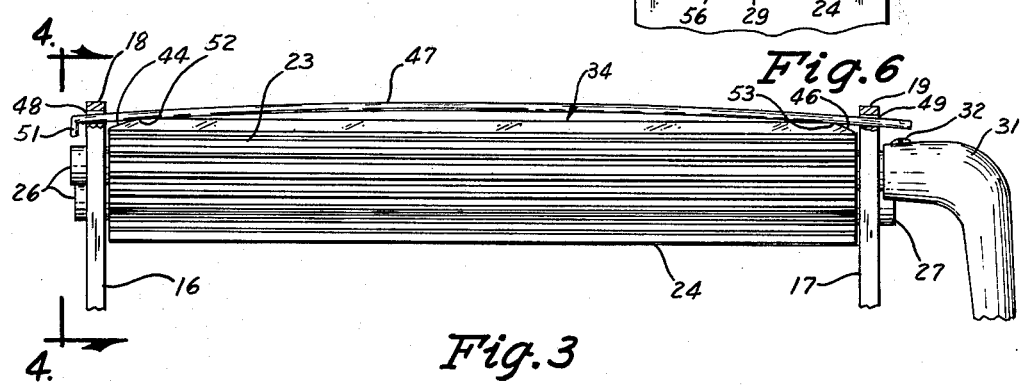

As shown in FIGS. 2 and 3, a pair of elongated rollers 23 and 24 extend between the upper end sections 18 and 19 of the legs 16 and 17, respectively. Each roller has axial projections 26 and 27 at its opposite ends which extend through the slots 21 and 22 and thus rotatably support the rollers on the frame 13. The roller 23 is forward of and in a plane above the roller 24. The peripheral surfaces of the rollers 23 and 24 have meshing gear teeth 28 and 29 which extend parallel to the axis of rotation and the entire length of the rollers. The rollers 23 and 24 have a diameter which is greater than the width of the slots 21 and 22 so that the opposite ends of each roller are positioned adjacent the inside surface of the corresponding upright legs 16 and 17 and thereby maintain the axial position of the rollers between the legs 16 and 17.

The rollers 23 and 24 are rotated in opposite directions by the use of a crank handle 31 which is mounted on the axial end projection 27 of the roller 23. A set screw 32 secures the handle 31 to the projection 27. The outer end of the crank handle 31 has a rotatable hand knob 33 which functions to minimize the slippage between the crank handle and the operator's hand during the use of the fish skinning apparatus. Rotation of the crank handle 31 applies a torque to the roller 23 which is transmitted by the meshing gear teeth 28 and 29 to the roller 24. Thus, the roller 23 may be viewed as a drive roller and the roller 24 viewed as the driven roller.

The teeth 28 and 29 of the respective rollers 23 and 24 are maintained in a driving relationship by the inclined slots 21 and 22 which have a length which permits the drive roller 23 to slide radially with respect to the driven roller 24 so as to vary the play or backlash between the teeth 28 and 29 of the rollers. The wall formed by the slots functions as a guide for the rollers limiting the relative lateral movement between the rollers. As shown in FIG. 6, the drive roller 23 has moved up the inclined slot 22 to its maximum position to permit the skin of the fish to move between the rollers. In this position the teeth 28 and 29 are still in a meshing relationship and have an appreciable amount of backlash between the coacting teeth.

As shown in FIG. 1 a blade member 34 is positioned above the rollers 23 and 24 and is pivotally mounted on the upper end sections 18 and 19 of the legs. The opposite ends of the rear section of the blade member 34 have axial extensions 36 and 37 which project into holes 38 and 39 in the upper end leg sections 18 and 19, respectively. The axial extensions 36 and 37 form a hinge connection for mounting the blade member 34 on the U-shaped frame 13.

The blade member 34 extends in a forward direction. The bottom of the forward section of the blade member 34 has a concave surface 41 which extends over and is engageable with a top sector of the teeth 28 of the drive roller 23. The radius of curvature of the concave surface 41 is substantially equal to the radius of the periphery of the drive roller 23. The forward section of the blade member 34 has a convex curved top surface 42 which extends downwardly and joins with the bottom surface 41 to form a transverse cutting edge 43 which is positioned slightly forward of a vertical plane passing through the axis of rotation of the drive roller 23.

As shown in FIG. 3, the opposite ends of the blade member 34 have downwardly and outwardly sloped edges 44 and 46 which form oppositely sloping cam surfaces the purpose of which is later described in detail.

The blade member 34 pivots about the axis established by the axial extensions 36 and 37. The forward section of the blade member 34 is biased in a downward direction by a resilient wire 47 which extends through holes 48 and 49 in the legs 16 and 17, respectively. The holes 48 and 49 are in axial alignment with each other and are in a plane which is below the plane of the top surface 42 of the blade member 34. In order to facilitate the removal and insertion of the wire 47 through the holes 48 and 49 one end of the wire has a right angle bend 51 which provides a convenient hand grip. As shown in FIG. 3, the wire 47 is bowed in an upward direction and engages opposite end portions 52 and 53 of the blade member which are adjacent the inclined edges 44 and 46. The deflected wire 47 biases the forward end of the blade member 34 in a downward direction against the top sector of the drive roller 43. The downward force on the drive roller 43 moves the roller 43 down the inclined slots 21 and 22 until the ends of the teeth 28 and 29 are in an abutting relationship. In other words, the deflected wire 47 biases the forward section of the blade member 34 into engagement with the teeth 28 of the drive roller 23 and biases the drive roller 28 into engagement with the driven roller 24.

Figure 5:
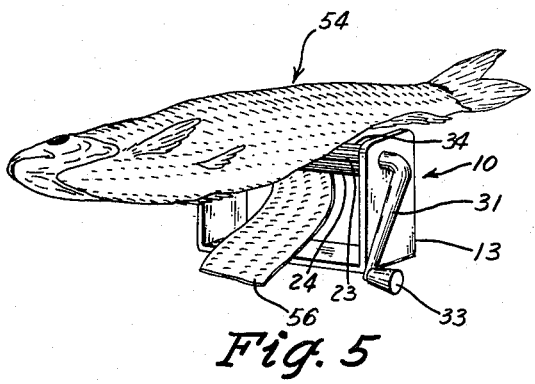
FIG. 5 is a perspective view of the fish skinning apparatus showing a fish in a supported position on the apparatus and a portion of the skin removed.

In use, a fish 54 as shown in FIG. 5 is manually held on the apparatus 10 with the tail end of the fish feeding into the blade member 34. The transverse cutting edge 43 of the blade 34 is positioned above the drive roller 23 and extends substantially parallel to its axis of rotation. As shown in FIG. 6, the cutting edge 43 is positioned at the juncture of the peeled back skin 56 and the flesh or fillet 57 of the fish. The free end of the skin 56 passes between the drive and driven rollers 23 and 24, respectively, and is gripped by the meshing teeth 28 and 29 of the rollers as they are rotated in the direction of the arrow 58. The skin 56 is pulled from the blade member 34 in a downward direction by the rollers and moves over the teeth 28 of the drive roller 23 and slides along the concave surface 41 of the blade member 34 into the bight between the rollers 23 and 24. The flesh 57 of the fish rides upwardly over the convex surface 42 of the blade member and moves rearwardly over the bowed wire 47 and the blade member 34. The skin 56 as it passes between the rollers 23 and 24 forces the drive roller 23 upwardly along the inclined slots 21 and 22 and thereby increases the bearing force of the drive roller 23 against the skin 56 in the area in which the cutting edge 43 is acting.

The fish 54 is advanced across the blade member 34 under the pulling action of the rollers 23 and 24 on the skin 56. When the crank handle 31 is rotated in a clockwise direction the roller 23 turns in the direction of the arrow 58 and pulls the skin between the rollers 23 and 24 thereby separating the skin 56 from the flesh 57. This operation is repeated until all of the skin has been removed from the body of the fish.

The blade member 34 and the rollers 23 and 24 are readily cleansed by merely removing the bowed wire 47. With the wire 47 removed the blade member 34 may be pivoted to an open position exposing the rollers 23 and 24. The top roller 23 is slidable along the slots 21 and 22 so that the area between the teeth may be thoroughly cleaned. To reassemble the apparatus to a cutting position the wire 47 is merely inserted into the hole 48 with the leading end thereof riding up on the inclined surface 44. The mid-portion of the wire 47 is deflected in an upward direction to permit the leading end to be inserted through the hole 49 of the leg 17. The opposite end portions 52 and 53 of the blade member 34 being above the plane of the axes of the holes 48 and 49 maintains the wire in a bowed position.

In summary the fish apparatus 10 has a skinning unit which comprises drive and driven rollers 23 and 24, respectively, and blade member 34 which is engageable with a top portion of the peripheral teeth of the drive roller 23. A deflected wire 47 engages the blade member 34 and biases the forward section of the blade member toward the drive roller 23 and concurrently biases the drive roller 23 into engagement with the driven roller 24. The teeth 28 of the drive roller 23 being positioned immediately below the transverse cutting edge 43 of the blade member 34 functions as a moving support which guides and feeds the skin 56 of the fish under the cutting edge 43 so as to effect a separation of the skin 56 from the flesh 57 of the fish.

While there have been shown, described, and pointed out the fundamental features of the invention it is to be understood that various omissions, substitutions, changes in form, and details of the apparatus illustrated may be made by those skilled in the art, without departing from the spirit of the invention. It is intended to be limited only as indicated by the scope of the following claims.

I claim:

1. A skinning apparatus comprising:
    (a) a frame having a pair of substantially parallel upright legs, each leg having a slot extended in an upward and forward direction,
    (b) front roller means extended between said legs, said front roller means having axial extensions at the opposite ends thereof positioned in the slots of the adjacent legs and teeth means on the peripheral surface thereof extended parallel to the axis of rotation of said roller means,
    (c) rear roller means extended between said legs substantially parallel to said front roller means, said rear roller means having axial extensions at the opposite ends thereof positioned in the slots of the adjacent legs and teeth means on the peripheral surface thereof in meshing engagement with the teeth means on the front roller means,
    (d) crank means secured to one of the axial extensions of said front roller means whereby upon turning of said crank means the front roller means is rotated downwardly to drive said rear roller means,
    (e) blade means having a forward section and a rear section, said rear section having axial projections at the opposite ends thereof rotatably mounted on the legs for movement about an axis positioned above the slots and extended substantially parallel to the axes of said front and rear roller means, said blade means extended forwardly from said axis in a plane substantially normal to a vertical plane extended through the axis of rotation of said front roller means, said forward section having a concave surface engageable with and extended about a top portion of the front roller means and an edge extended axially of said front roller means in close proximity to the terminating ends of the teeth means thereon, and
    (f) means connected to said legs and engageable with the top of the forward section of said blade means and operable to bias said forward section of the blade means into engagement with said front roller means.

2. The skinning apparatus defined in claim 1 wherein the means to bias the blade means comprises:
    (a) a resilient wire of a bow-shape extended longitudinally of said blade means and mounted on the legs for engagement with opposite end sections of the forward section of the blade means.

3. A skinning apparatus comprising:
    (a) support means,
    (b) first and second rollers having coacting engageable teeth means,
    (c) guide means for rotatably mounting said first and second rollers on said support, said guide means having a length to permit limited lateral movement of the first roller relative to the second roller,
    (d) blade means pivotally mounted on said support means for movement about an axis substantially parallel to the axes of said rollers, said blade means being horizontally extended from said axis for engagement with a portion of the first roller and terminating in an edge adjacent the periphery of said first roller, and
    (e) means biasing said blade means into engagement with said first roller and thereby biasing said first roller toward the second roller.

4. A skinning apparatus comprising:
    (a) upright support means,
    (b) a drive roller and driven roller having coacting engageable teeth means,
    (c) guide means engageable with said rollers for slidably mounting said rollers on said support means for lateral movement of the drive roller relative to the driven roller, (d) blade means pivotally mounted on said support means for movement upwardly from a horizontal position, said blade means in the horizontal position having a concave surface engageable with and extended about a portion of said drive roller and an edge positioned immediately above said drive roller, with the skin removed by the blade means being movable between said concave surface and drive roller portion, and (e) means biasing said blade means toward said drive roller and thereby biasing said drive roller into engagement with said driven roller.

References Cited by the Examiner

UNITED STATES PATENTS

| | | | |
|---|---|---|---|
| 509,323 | 11/93 | Oakes | 17—26 |
| 615,132 | 11/98 | Bice | 17—26 |
| 2,455,831 | 12/48 | Townsend. | |
| 2,590,747 | 3/52 | Birdseye. | |
| 2,605,495 | 8/52 | Daniels | 17—2 |
| 2,881,469 | 4/59 | DeMoss | 17—2 |

SAMUEL KOREN, *Primary Examiner.*

LUCIE H. LAUDENSLAGER, *Examiner.*